United States Patent [19]
Breeden et al.

[11] 3,888,647
[45] June 10, 1975

[54] AIR COOLED ANNULAR PARISON BLANK MOLD

[75] Inventors: Donald H. Breeden, Millville, N.J.; John M. Bowles, Winchester, Ind.

[73] Assignee: Maul Bros. Inc., Millville, N.J.

[22] Filed: Apr. 15, 1974

[21] Appl. No.: 461,059

[52] U.S. Cl. ............ 65/29; 65/83; 65/162; 65/267; 65/319; 65/356; 165/40; 165/154; 249/79
[51] Int. Cl. .............................................. C03b 9/38
[58] Field of Search .......... 65/355, 356, 29, 84, 83, 65/137, 162, 267, 319; 165/40, 154; 249/79, 81

[56] References Cited
UNITED STATES PATENTS

| 1,776,355 | 9/1930 | Eppensteiner | 249/79 |
| 1,988,425 | 1/1935 | Summey | 249/79 |
| 3,027,685 | 4/1962 | Cooke | 65/356 |
| 3,213,929 | 10/1965 | Marshall et al. | 165/40 X |
| 3,628,601 | 12/1971 | Snaper | 165/169 X |
| 3,630,707 | 12/1971 | Ayers | 65/319 X |
| 3,666,433 | 5/1972 | Nebelung et al. | 65/162 X |

*Primary Examiner*—Robert L. Lindsay, Jr.
*Attorney, Agent, or Firm*—Seidel, Gonda & Goldhammer

[57] ABSTRACT

The annular parison blank mold of a press and blow system for making glassware has air flow control means including fins and a sleeve to selectively control flow of cooling air on the outer periphery of said blank mold.

20 Claims, 14 Drawing Figures

PATENTED JUN 10 1975  3,888,647
SHEET 1
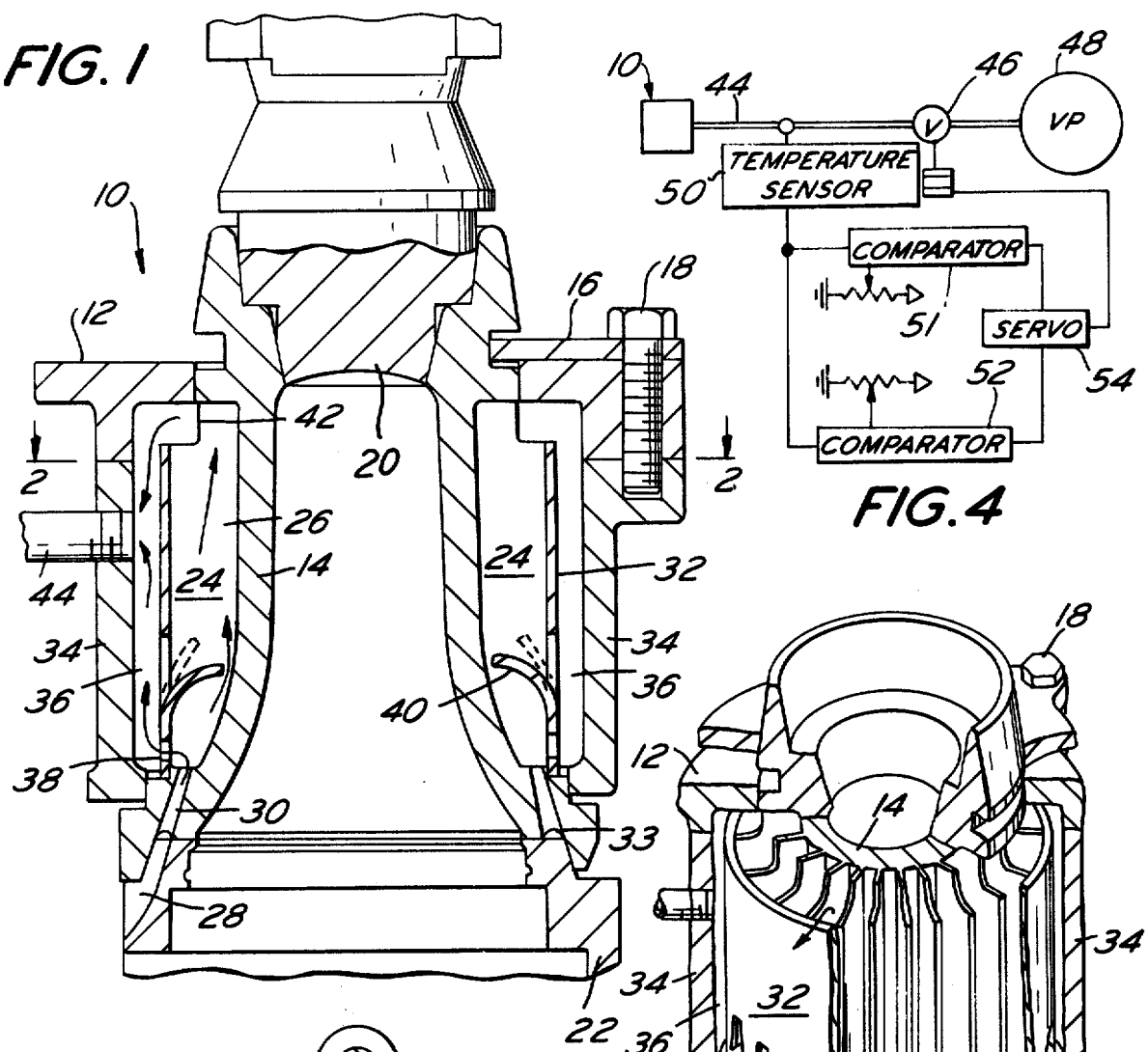
FIG. 1
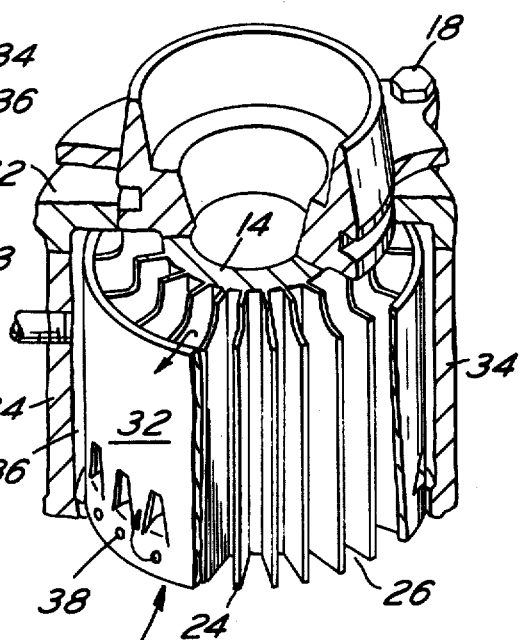
FIG. 4
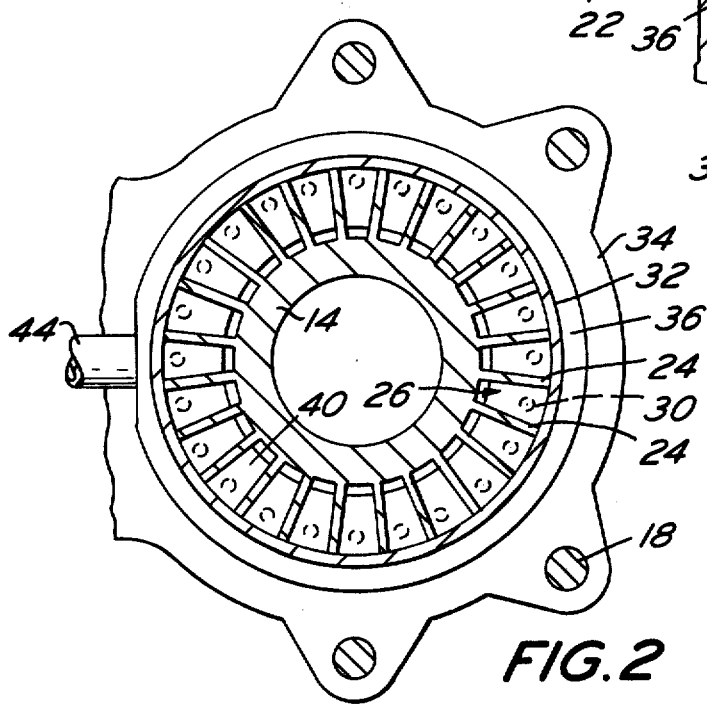
FIG. 3
FIG. 2

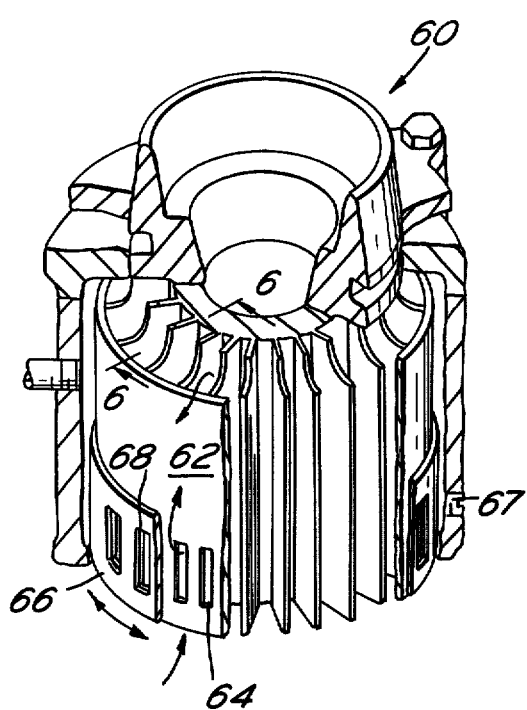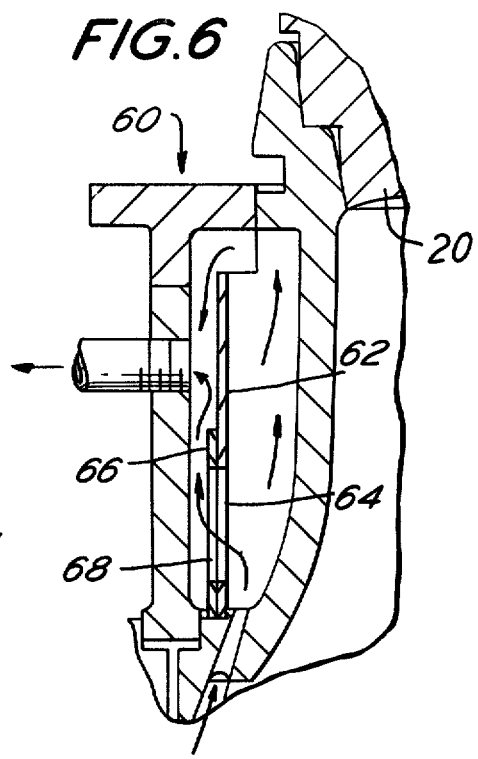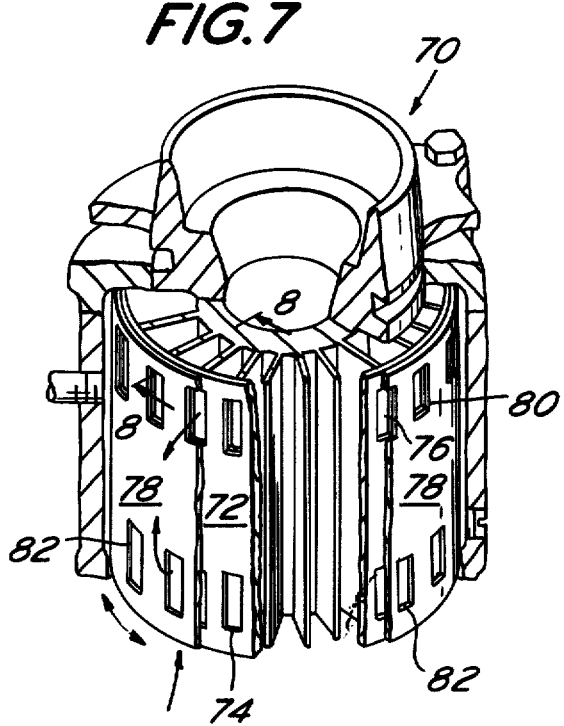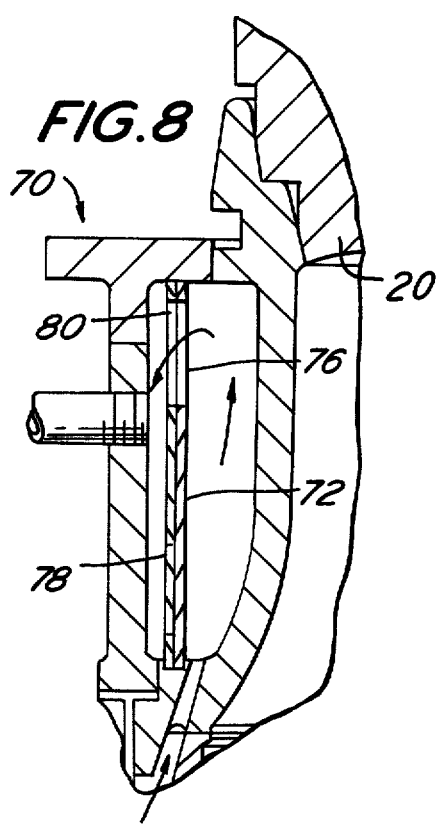

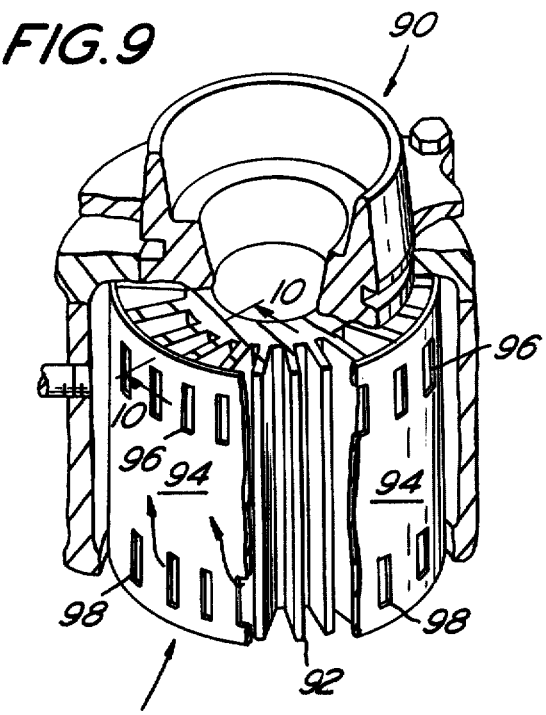
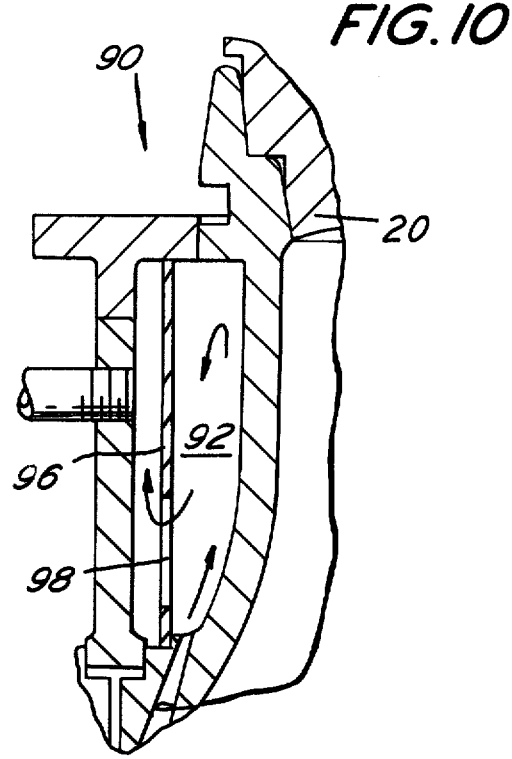
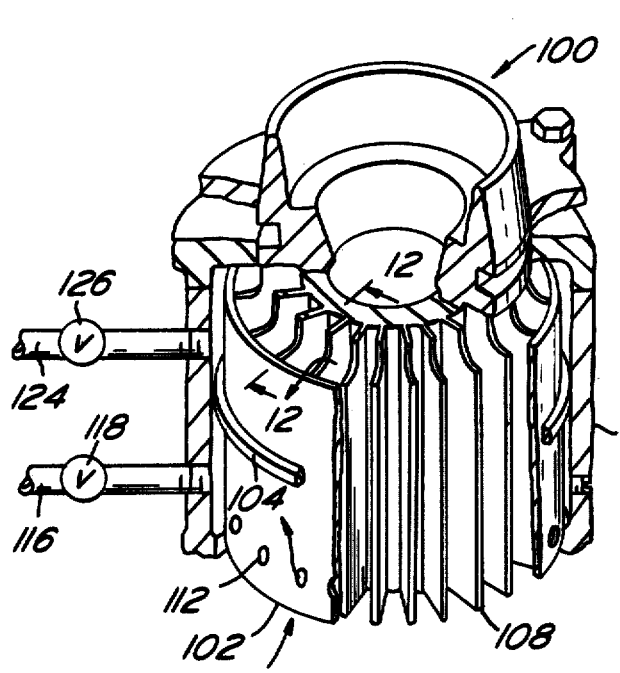
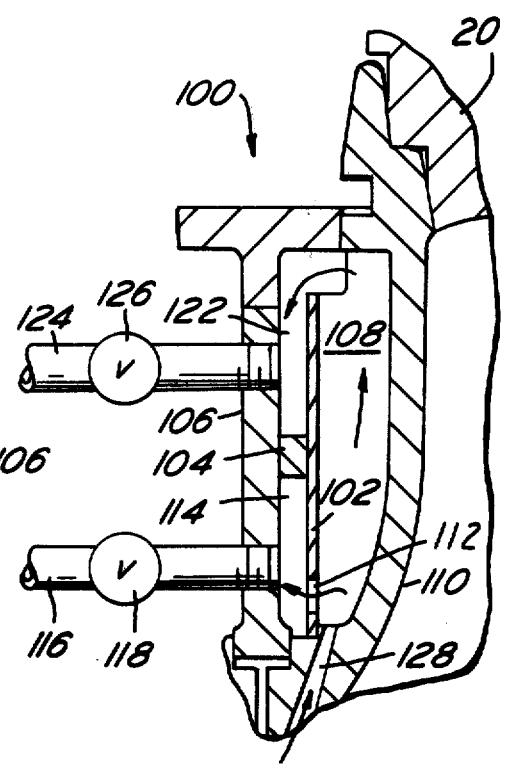

AIR COOLED ANNULAR PARISON BLANK MOLD

DISCLOSURE

This invention is directed to apparatus for use in a press and blow system for making glassware, and more Particularly, to an air cooled annular parison blank mold. Blank molds of the type referred to herein may be solid or split. This invention is particularly adapted for use with solid blank molds.

The present invention may be utilized in conjunction with a system having a single parison blank mold for making glassware one at a time. Alternatively, the present invention in its broadest aspects includes a plurality of parison blank molds on a common support for making a plurality of glassware simultaneously. It is known to make two or more articles of glassware simultaneously and to provide some type of air cooling means for the parison blank molds. For example, see U.S. Pat. No. 3,241,941.

The present invention will be described hereinafter in conjunction with a plurality of embodiments. In each such embodiment, an annular parison blank mold is surrounded by a sleeve spaced therefrom to define a first annular flow chamber therebetween. Fins are provided on either the sleeve or the blank mold to divide the first air flow chamber into discrete flow passages. A second air flow chamber surrounds the sleeve and the first air flow chamber.

Each of the above mentioned air flow chambers communicates with an inlet and an outlet. A means is provided for controlling flow from the inlet to the outlet in a manner so that the amount of air flowing through the first and second chambers is selectively adjustable. In this manner, the temperature on the outer periphery of the parison blank mold may be controlled and kept within a predetermined desired range. As a result thereof, more uniform glassware will be attained at a maximum production rate.

Parison blank molds are generally bell-shaped with the largest cross-sectional area being at the lower end of the mold. In accordance with the present invention, the inlet to the above mentioned first and second chambers is preferably adjacent the lower end of the mold. Said inlet communicates directly with the surrounding atmosphere. The outlet is preferably connected to the inlet side of the vacuum pump. In this manner, air is sucked through the chambers rather than being pumped under pressure through the chambers. It is believed that a greater degree of turbulence and uniformity of air contact is attained when the outlet from the chambers is connected to a vacuum pump.

Between the chambers and the vacuum pump, there is preferably provided a temperature detector and a flow control valve. When the detector senses that the discharged air exceeds a predetermined range such as 180°-200°F., the control valve is automatically operated to cause the temperature to change. The control valve bleeds atmospheric air to the inlet side of the vacuum pump.

If the temperature detector senses a temperature above the preset range, the control valve will be closed so that no external air bleeds into the inlet side of the vacuum pump. If the detector senses a temperature below the predetermined range, the control valve will bleed air into the inlet side of the vacuum pump. The particular temperature range may vary as a result of a variety of factors including atmospheric temperature, size and shape of the glassware being manufactured, structural details of the parison blank mold such as the material from which it is made and the wall thickness thereof, etc.

It is an object of the present invention to provide novel apparatus and method for use in controlling cooling air on the outer periphery of a blank mold.

It is another object of the present invention to provide novel apparatus and method for selectively controlling the temperature of cooling air with respect to an annular solid blank parison mold for use in press and blow formation of glassware.

It is another object of the present invention to provide for selective control of air flow with respect to a parison mold in a manner which is simple, readily adjustable, and reliable for the intended purpose.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a vertical sectional view through a parison mold and its holder in accordance with the present invention.

FIG. 2 is a sectional view taken along the line 2—2 in FIG. 1.

FIG. 3 is a partial perspective view of the structure shown in FIG. 1 with portions broken away and hatched for purposes of illustration.

FIG. 4 is a diagrammatic illustration of a parison mold and means for causing flow of cooling air along the outer periphery of the parison mold.

FIG. 5 is a view similar to FIG. 3 but illustrating another embodiment.

FIG. 6 is a sectional view taken along the line 6—6 in FIG. 5.

FIG. 7 is a view similar to FIG. 5 but illustrating another embodiment.

FIG. 8 is a sectional view taken along the line 8—8 in FIG. 7.

FIG. 9 is a view similar to FIG. 5 but illustrating another embodiment.

FIG. 10 is a sectional view taken along the line 10—10 in FIG. 9.

FIG. 11 is a view similar to FIG. 3 but illustrating another embodiment.

FIG. 12 is a sectional view taken along the line 12—12 in FIG. 11.

Figure 13:
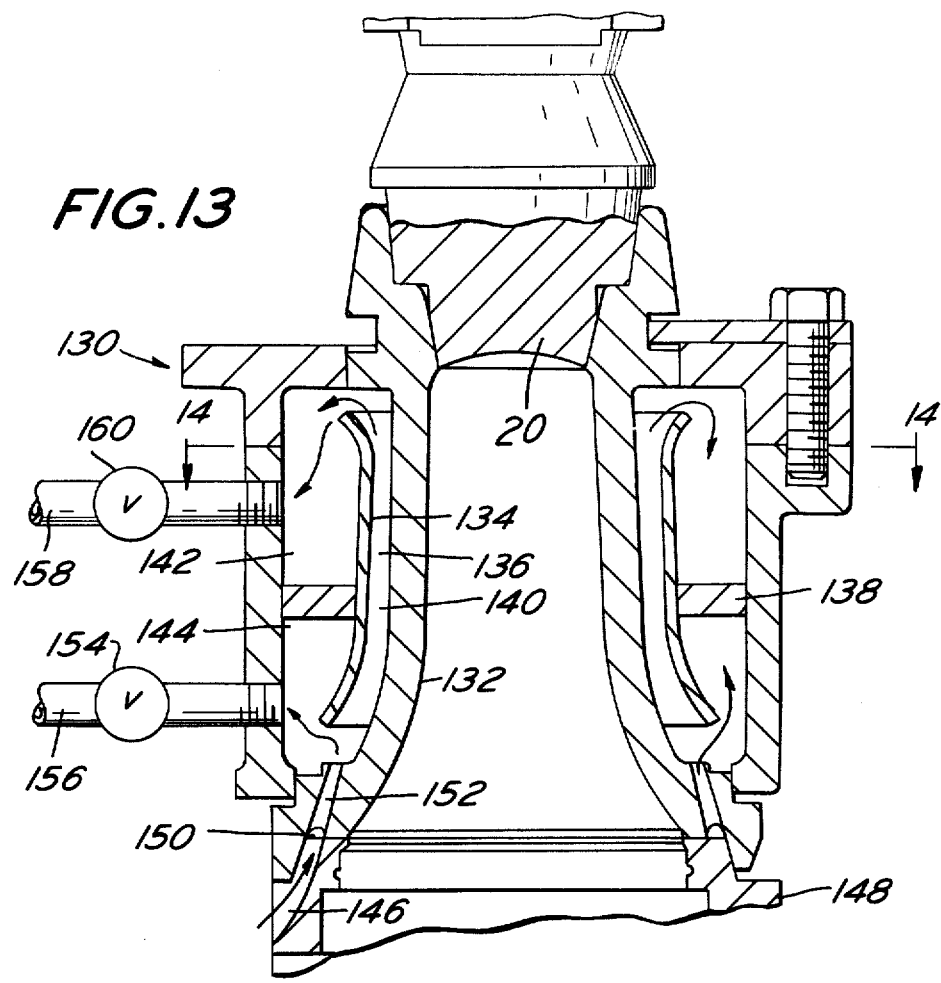
FIG. 13 is a view similar to FIG. 1 but illustrating another embodiment.

Referring to the drawings in detail, wherein like numerals indicate like elements, there is shown in FIG. 1 apparatus in accordance with the present invention designated generally as 10. The apparatus 10 includes a mold holder arm 12. Arm 12 is mounted for vertical motion and for rotation about a horizontal axis and is adapted to support one or more annular parison blank molds 14. Each blank mold 14 may be supported by the arm 12 in any convenient manner such as collar 16 extending into an annular groove adjacent the upper end of the mold 14. Collar 16 may be removably bolted to the arm 12 by use of bolts 18.

As shown in FIG. 1, the upper end of the flow passage through the blank mold 14 is closed by a baffle 20 movably supported from above in a conventional manner. Baffle 20 is mounted for movement toward and away from the blank mold 14 and is adapted to rotate out of the way so that a gob may enter the blank mold 14 through the upper end thereof. A flat surface on the lower end of the blank mold 14 rests on a flat surface on the upper end of a neck ring assembly 22. A radially outwardly and downwardly tapering surface on the lower end of the blank mold 14 may cooperate with a mating surface on the neck ring 22.

As shown more clearly in FIGS. 2 and 3, a plurality of radially outwardly directed fins 24 are provided on the outer peripheral surface of the blank mold 14. The fins 24 are each disposed generally along a radius of mold 14. A stationary cylindrical sleeve 32 surrounds the fins 24 and contacts the outer peripheral surface of the fins 24. The space between the sleeve 32 and the body of the blank mold 14 defines a first flow chamber 26. Chamber 26 is divided into a plurality of parallel flow passages by the fins 24.

The neck ring assembly 22 has a passageway 28 communicating with the atmosphere at one end and terminating at its other end in communication with an annular groove 33 on said aforementioned flat surface at the lower end of the blank mold 14. A plurality of passageways 30 in mold 14 communicate at one end with groove 33 and at their other end with the chamber 26.

The holder arm 12 has an annular housing coupled thereto by the bolts 18 and includes a cylindrical wall 34 which surrounds and is spaced from the sleeve 32. The space between the sleeve 32 and wall 34 constitutes a second annular flow chamber 36. The sleeve 32 is provided with a plurality of air flow passages 38 adjacent its lower end. Air from passageway 30 may flow directly into chamber 26 or into chamber 36 by way of the passageways 38.

As shown more clearly in FIGS. 1 and 3, the sleeve 32 is provided with a plurality of circumferentially disposed flow restrictor members 40. The members 40 are constructed by punching out three sides of a truncated triangle from the material of the sleeve 32. Each member 40 may be bent to any one of a variety of positions beginning at the plane of the sleeve 32 to a position wherein the member 40 completely closes the juxtaposed flow passage defined by adjacent fins 24. One such position of the members 40 is illustrated in solid lines in FIG. 1 with a less restrictive position indicated in phantom lines.

The extent to which each of the members 40 is bent for purposes of restricting flow through its respective flow passage defined by adjacent fins 24, in manually adjustable. Flow passages 38 provide constant open communication between the passageways 30 and the second chamber 36. Hence, the amount of air flowing through the first chamber 26 depends upon the position to which the members 40 have been manipulated.

The upper end of the first chamber 26 communicates with the upper end of the second chamber 36 by way of the notch 42 at the upper end of each fin 24. A conduit 44 has one end connected to the wall 34 and communicates with the chamber 36. The other end of conduit 44 is connected to the inlet side of a vacuum pump 48. See FIG. 4. Conduit 44 includes a selectively operable bleed valve 46 for selectively bleeding air into conduit 44 upstream of the vacuum pump 48.

A temperature sensor 50 detects the temperature of the air flowing through conduit 44. A voltage signal was generated by the temperature sensor 50 and transmitted to comparators 51 and 52 disposed in parallel. Each comparator is coupled to a reference signal by means of an adjustable potentiometer. One of the comparators is set for a signal below the predetermined range and the other is set for a signal above the predetermined range. Each comparator 51, 52 is coupled to a servo 54 which in turn is coupled to a solenoid actuator on valve 46.

On a round pint mayonnaise jar constructed of about 7½ to 8 ounces of glass, it has been found that the best results are obtained when the air is a range of 180°–200°F., preferably at about 190°F. Valve 46 was set to bleed a predetermined amount of air into the conduit 44 upstream from the vacuum pump 48. Comparator 41 may be set to be triggered and generate a signal for activating the servo 54 when the temperature sensor 50 transmits a voltage indicative of air temperature less than a 180°F. Likewise, comparator 52 may set to activate the servo 54 when the air temperature in conduit 44 as detected by sensor 50 exceeds 200°F. Depending upon which comparator activates the servo 54, it either opens or closes valve 46.

If the air temperature in conduit 44 detected by sensor 50 is less than 180°, servo 54 is activated by comparator 51 to move valve 46 to introduce more air into conduit 44 upstream of the vacuum pump 48. An opposite adjustment is made when servo 54 is activated by comparator 52.

The press and blow system when incorporated in an IS machine, generally operates 24 hours a day. The ambient air temperature varies from night and day operation. No attempt is made to keep the air flow in conduit 44 constant. Instead, the present invention attempts to maintain the temperature of the air in conduit 44 within a predetermined range whereby the temperature of the outer surface of the blank mold 14 will be best suited for producing quality glassware depending upon the weight of the glass, the bottle size and shape, the speed of operation, etc.

The control functions provided by the structure illustrated in FIG. 4 referred to above supplements the control attained directly at the sleeve 32. The members 40 will be prepositioned prior to a production run on the basis of test runs so as to be at the proper position so that all or part of the air flowing from the inlet to the outlet will pass through chamber 36.

In FIG. 5, there is illustrated another embodiment of the present invention designated generally as 60. The embodiment 60 is identical with that described above except as will be made clear herinafter. In this embodiment, the sleeve 62 has flow passages 64 adjacent its lower end. A second sleeve 66 is rotatably supported by the blank mold. Sleeve 66 has flow passages 68. The rotative disposition of sleeve 66 relative to sleeve 62 determines the extent to which the flow passages 64 and 68 overlap to thereby control the amount of flow from the inlet to the outlet by way of a chamber radially inwardly of the sleeve or a chamber radially outwardly of the sleeve.

In FIGS. 7 and 8, there is illustrated another embodiment of the present invention designated generally as 70. The embodiment 70 is the same as the embodiment 60 except as will be made clear hereinafter. In embodiment 70, sleeve 72 has flow passages 74 adjacent its lower end and flow passages 76 adjacent its upper end.

A sleeve 78 surrounds the sleeve 72 and is rotatably adjustable with respect to sleeve 72.

The sleeve 78 contains flow passages 80 adjacent its upper end and flow passages 82 adjacent its lower end. The flow passages 74 and 76 are disposed in alignment with one another on sleeve 72. The flow passages 80 and 82 are staggered with respect to each other on sleeve 78. When a flow passage 76 in sleeve 72 communicates with a flow passage 80 in sleeve 78, the flow passages 74 and 82 do not communicate with one another. Sleeve 78 may be manipulated to a position wherein there is a partial overlap of the various flow passages at the upper or lower ends of the sleeves 72 and 78.

In FIGS. 9 and 10, there is illustrated another embodiment of the present invention designated 90. The embodiment 90 is the same as that disclosed above except as will be made clear hereinafter. In this embodiment, the sleeve 94 has flow passages 96 circumferentially disposed adjacent its upper end and staggered with respect to circumferentially disposed flow passages 98 adjacent its lower end. The transverse dimensions of the flow passages 96 and 98 correspond generally to the width of the outer peripheral surface of the fins 92. When the outer peripheral surface of a fin 92 completely blocks flow passage 96, each flow passage 98 is in complete communication with a passageway between two adjacent fins 92. Thus, the fins 92 and the sleeve 94 cooperate to perform a valving action due to rotation of sleeve 94 relative to the fins 92. Sleeve 94 has a rotative disposition wherein a portion of each of the passages 94 and 96 communicate with the chamber surrounding the sleeve 94.

In FIGS. 11 and 12, there is illustrated another embodiment of the present invention designated generally as 100. The embodiment 100 is the same as that described above except as will be made clear hereinafter. In this embodiment, the sleeve 102 is provided with a radially outwardly directed divider wall 104 which contacts the inner periphery of the wall 106. Wall 106 corresponds to wall 34. The annular parison blank mold designated 110 has fins 108 which correspond to the fins 24.

The sleeve 102 has flow passages 112 adjacent its lower periphery in the same manner as sleeve 32 which had flow passages 38 circumferentially disposed about its lower end. The air flow chamber below divider wall 104 and between sleeve 102 and wall 106 is designated 114. Chamber 114 is connected to outlet conduit 116 containing a selectively operable valve 118.

The flow chamber radially inwardly of the sleeve 102 is designated 120. Chamber 120 is divided into parallel flow passages by the fins 108. The upper end of chamber 120 communicates with chamber 122 which is disposed above the divider wall 104, radially outwardly of the sleeve 102, and radially inwardly of the wall 106. Chamber 122 communicates with outlet conduit 124 containing a selectively operable valve 126. Thus, flow from passageway 128 may be directed to conduit 116 by way of flow passageways 112 and chamber 114. Also, flow from passageway 128 may be directed to conduit 124 by way of chambers 120 and 122. The amount of air flow may be regulated by adjusting the valves 118 and 126. Conduits 116 and 124 merge downstream from the valves 118, 126 for subsequent coupling to the inlet side of the vacuum pump. Thus, valves 118 and 126 are upstream from the temperature sensor and upstream from the control valve 46.

Figure 14:
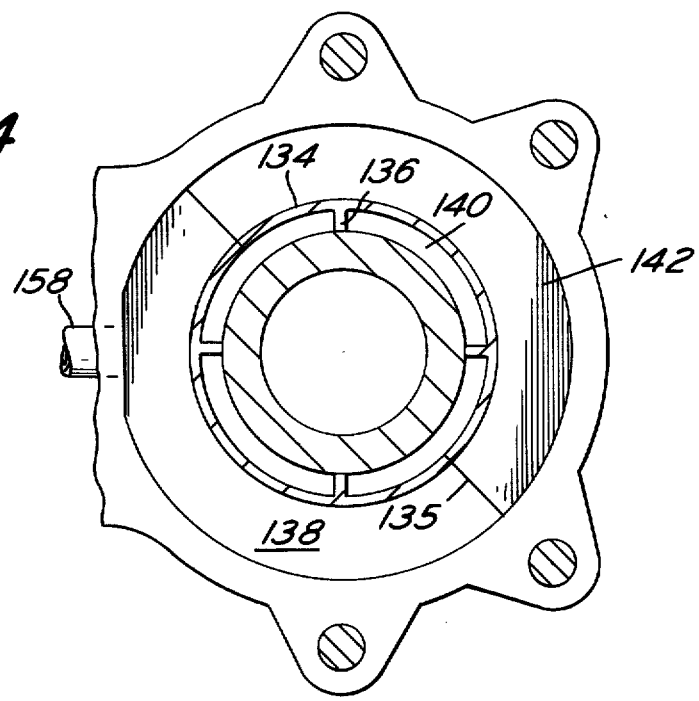
FIG. 14 is a sectional view taken along the line 14—14 in FIG. 13.

In FIGS. 13 and 14, there is illustrated another embodiment of the present invention designated generally as 130. The embodiment 130 is the same as the embodiments described above except as will be made clear hereinafter. In this embodiment, the sleeve 134 has fins 136 on its inner peripheral surface. Thus, in this embodiment the fins are on the sleeve rather than being on the blank mold 132. To facilitate assembly, sleeve 134 may be split into halves as indicated by the parting line 135.

The sleeve 134 has a radially outwardly disposed divider wall 138 which is comparable to wall 104. The air flow chamber between the outer periphery of the blank mold 132 and the inner periphery of the sleeve 134 is designated 140 and divided into parallel flow passages by the fins 136.

The chamber radially outwardly of the sleeve 132 and above wall 138 is designated 142 while the comparable chamber below wall 138 is designated 144.

Due to the length of the sleeve 134, it will be noted that chamber 144 communicates directly with the flow passage 152. Each of the flow passages 152 communicate with the annular groove 150 on a flat bottom surface of the blank mold 132. The groove 150 communicates with a plurality of the passages 146 in the neck ring assembly 148.

A conduit 156 communicates with chamber 144 and contains a selectively operable valve 154. A conduit 158 communicates with chamber 142 and contains a selectively operable valve 160. Thus, it will be noted that embodiment 130 is similar to embodiment 100 but differs therefrom in the nature of the sleeve 134. Sleeve 134 follows the contour of the outer peripheral surface of the blank mold 132, has fins on its inner peripheral surface integral therewith, and is shorter in length so as to eliminate the need for a flow passage comparable to flow passages 112.

In each of the above described embodiments of the present invention, there is provided a means for adjusting the rate of flow through first and second concentric annular chambers surrounding the blank mold. In addition, there is provided a temperature sensor in the air flow system downstream from the blank mold for detecting the exhaust temperature and for controlling the effect of operation of the vacuum pump as a function of the sensed temperature.

In each embodiment, the annular parison blank mold is preferably precision cast from a chrome-nickel steel. Where fins are indicated as being on the blank mold, such fins are cast integral with the body of the blank mold.

The use of a temperature sensor and bleed valve coupled together as disclosed in FIG. 4 are representative of structure for performing the intended function of maintaining the temperature of the discharge air substantially constant. Other devices may be used to perform this function.

In FIGS. 1, 11 and 13 the sleeve is stationary. In FIGS. 5 and 7 there is provided a stationary sleeve and a rotatable sleeve. In FIG. 9 there is provided a single rotatable sleeve which for the purposes of this disclosure may be considered the preferred embodiment. In FIGS. 7–10, the upper end of the fins are not notched.

If minor adjustments of a rotatable sleeve such as sleeve 66 are desired during operation, a hole may be provided in wall 34 through which a tool such as a screw driver may extend to facilitate such adjustment. A removable threaded plug 67 may be used to close the hole in wall 34.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for use in forming glassware comprising an annular parison blank mold, a sleeve surrounding and spaced from the outer periphery of said mold to define a first flow chamber therebetween, means defining a second flow chamber radially outwardly from said first flow chamber, longitudinally extending fins on at least one of said sleeve and mold, said fins being radially disposed with respect to said mold for dividing said first air flow chamber into discrete axial flow passages, means defining an inlet to and an outlet from said flow chambers, and means for controlling flow from said inlet through said chambers to said outlet in a manner so that the amount of air flow through the first and second chambers is selectively adjustable.

2. Apparatus in accordance with claim 1 wherein said last mentioned means includes means mounting said sleeve for rotation with respect to the fins which are on said mold, said sleeve having a plurality of circumferentially disposed flow passages therein, and means defining a stationary valving surface for cooperation with said flow passages in said sleeve to control flow from the first chamber to the second chamber through said sleeve.

3. Apparatus in accordance with claim 2 wherein said valving surface is the outer peripheral surface of the fins.

4. Apparatus in accordance with claim 2 wherein said valving surface is a second sleeve concentric with said first mentioned sleeve.

5. Apparatus in accordance with claim 1 wherein said means for controlling flow from the inlet to the outlet includes a plurality of flow restrictor members on said sleeve, said last mentioned members being movable into flow passages between adjacent fins.

6. Apparatus in accordance with claim 1 including means dividing the second chamber into upper and lower portions, each of said chamber portions communicating with the first chamber adjacent one end of the first chamber, first and second outlet conduits, each outlet conduit communicating with one of said chamber portions, each conduit including valve means for selectively restricting flow therethrough.

7. Apparatus in accordance with claim 1 wherein the inner peripheral surface of said sleeve conforms generally to the outer peripheral surface of said blank mold so that the width of said first chamber is substantially uniform for a substantial portion of its length.

8. Apparatus in accordance with claim 7 wherein said fins are integral with said sleeve and project radially inwardly to the outer periphery of said blank mold.

9. Apparatus in accordance with claim 1 wherein said blank mold is a single piece mold, and said sleeve being annular with its central portion being imperforate.

10. Apparatus in accordance with claim 1 wherein said inlet includes a plurality of flow passages in said blank mold adjacent the end of greatest transverse dimensions on said blank mold, said last mentioned inlet passages communicating with atmosphere, a conduit communicating with at least a portion of said second chamber, said conduit being connected to the inlet side of a vacuum pump, and means for detecting the temperature of air flowing through said conduit and for controlling said pump as a function of the detected temperature.

11. Apparatus in accordance with claim 1 wherein one end of said fins is notched to provide communication between said chambers, said sleeve having flow passages adjacent the other end of said fins, and a second sleeve surrounding said first mentioned sleeve, said second sleeve being rotatable with respect to said first mentioned sleeve to control flow through the flow passages in said first mentioned sleeve.

12. Apparatus in accordance with claim 1 the length of said sleeve in an axial direction is at least as long as the fins, said sleeve having flow passages adjacent its opposite ends, a second sleeve surrounding said first mentioned sleeve, said second sleeve being rotatable with respect to said first mentioned sleeve to control flow through the flow passages in said first mentioned sleeve.

13. Apparatus in accordance with claim 6 wherein one end of said fins is notched to provide communication between said chambers.

14. Apparatus for use in forming glassware comprising an annular parison blank mold, a mold holder arm, said mold being supported by said arm, means defining a first wall around said blank mold and spaced therefrom to define a first chamber, means defining a second wall around said first wall and spaced therefrom to define a second chamber, means defining an inlet communicating with atmosphere and said first chamber, means providing communication between said chambers, means for enabling some air from said inlet to flow to said second chamber without the air passing through any substantial portion of said first chamber, a vacuum pump, a conduit having one end connected to the inlet of said vacuum pump and another end connected to said second chamber, whereby said vacuum pump causes air from the surrounding atmosphere to flow through said inlet and then split into separate streams which pass through said chambers and then into said conduit.

15. Apparatus in accordance with claim 14 including means for detecting the temperature of air in said conduit and for controlling the rate of flow of air through said chambers as a function of the detected temperature.

16. Apparatus in accordance with claim 14 wherein said first wall is imperforate in its central zone and has flow passages adjacent at least one end thereof to provide communication between said chambers.

17. Apparatus in accordance with claim 14 wherein said first wall is cylindrical and at least a portion thereof is rotatable about the longitudinal axis of said mold.

18. A method of cooling a parison blank mold comprising the steps of providing first and second annular flow chambers around a blank mold with the first chamber being between the second chamber and the blank mold, using the suction side of a vacuum pump to cause some air to cool said mold by flowing from an inlet through the first chamber and then to the second chamber, using the suction side of said vacuum pump to cause some air to flow from said inlet to said second chamber without the air passing through any substantial portion of said first chamber, and controlling the amount of air flowing from said inlet to at least one of said chambers to thereby control the cooling effect of the air on said mold.

19. A method in accordance with claim 18 including detecting the temperature of air at a location between said second chamber and the inlet to said vacuum pump, generating a signal as a function of said detected temperature, and controlling the rate of flow through each said chambers in response to said signal to maintain the detected temperature within a predetermined range.

20. A method in accordance with claim 18 including controlling flow from the inlet to said second chamber by use of a rotatable sleeve having flow passages adjacent at least one end and located between the chambers.

* * * * *